United States Patent
Virk et al.

(10) Patent No.: US 12,211,196 B2
(45) Date of Patent: Jan. 28, 2025

(54) ENSEMBLE OF DEEP LEARNING MODELS FOR DEFECT REVIEW IN HIGH VOLUME MANUFACTURING

(71) Applicant: KLA Corporation, Milpitas, CA (US)

(72) Inventors: Kuljit S. Virk, Fremont, CA (US); Vera Andreeva, Santa Clara, CA (US); Lawrence Muray, Moraga, CA (US)

(73) Assignee: KLA Corp., Milpitas, CA (US)

(*) Notice: Subject to any disclaimer, the term of this patent is extended or adjusted under 35 U.S.C. 154(b) by 98 days.

(21) Appl. No.: 18/305,287

(22) Filed: Apr. 21, 2023

(65) Prior Publication Data

US 2024/0354925 A1 Oct. 24, 2024

(51) Int. Cl.
G06T 7/00 (2017.01)
G06V 10/774 (2022.01)
G06V 10/776 (2022.01)
G06V 20/70 (2022.01)

(52) U.S. Cl.
CPC .......... *G06T 7/0004* (2013.01); *G06V 10/774* (2022.01); *G06V 10/776* (2022.01); *G06V 20/70* (2022.01); *G06T 2207/10061* (2013.01); *G06T 2207/20076* (2013.01); *G06T 2207/20081* (2013.01); *G06T 2207/20084* (2013.01); *G06T 2207/30148* (2013.01)

(58) Field of Classification Search
CPC ......... G06T 7/0004; G06T 2207/10061; G06T 2207/20076; G06T 2207/20081; G06T 2207/20084; G06T 2207/30148; G06V 10/774; G06V 10/776; G06V 20/70
See application file for complete search history.

(56) References Cited

U.S. PATENT DOCUMENTS

| | | |
|---|---|---|
| 8,126,255 B2 | 2/2012 | Bhaskar et al. |
| 8,664,594 B1 | 4/2014 | Jiang et al. |
| 8,692,204 B2 | 4/2014 | Kojima et al. |
| 8,698,093 B1 | 4/2014 | Gubbens et al. |
| 8,716,662 B1 | 5/2014 | MacDonald et al. |

(Continued)

FOREIGN PATENT DOCUMENTS

KR 10-2022-0033510 3/2022

OTHER PUBLICATIONS

Friedman et al., "Additive Logistic Regression: A Statistical View of Boosting (with discussion and a rejoinder by the authors)," The Annals of Statistics, 28(2), 337-407 (2000).

(Continued)

*Primary Examiner* — Ping Y Hsieh
(74) *Attorney, Agent, or Firm* — Ann Marie Mewherter (57) ABSTRACT

Methods and systems for detecting defects in images of a specimen are provided. One system includes a computer subsystem configured for training an ensemble of deep learning models by altering one or more parameters of the ensemble until a pseudo-loss function determined based on output of the ensemble is approximately equal to but not greater than 0.5. The computer subsystem is also configured for detecting defects in runtime specimen images by inputting the runtime specimen images into the trained ensemble and generating runtime labels for the runtime specimen images indicating if a defect has been detected in the runtime specimen images based on outputs of the deep learning models in the trained ensemble.

20 Claims, 5 Drawing Sheets

(56) References Cited

U.S. PATENT DOCUMENTS

| | | | |
|---|---|---|---|
| 9,222,895 | B2 | 12/2015 | Duffy et al. |
| 9,816,939 | B2* | 11/2017 | Duffy .................... H01J 37/28 |
| 2019/0303717 | A1* | 10/2019 | Bhaskar ............... G06F 18/214 |
| 2021/0010953 | A1* | 1/2021 | Adler .................... G06N 20/00 |
| 2021/0183052 | A1* | 6/2021 | Ikeda ...................... G06T 7/90 |
| 2021/0272273 | A1* | 9/2021 | Brauer .................. G06N 3/045 |
| 2022/0076404 | A1* | 3/2022 | Imoto ................... G06F 18/214 |
| 2022/0134435 | A1* | 5/2022 | Scime ..................... G06T 7/11 |
| | | | 264/112 |

OTHER PUBLICATIONS

Freund et al., "A Decision-Theoretic Generalization of On-Line Learning and an Application to Boosting," Journal of Computer and System Sciences, 55, 119-139 (1997).

Hastie et al.. "The Elements of Statistical Learning," (Second Edition), Springer, New York, NY, 764 pages, (Feb. 9, 2009).

Schapire, "The Strength of Weak Learnability," Machine Learning, 5(2), 197-227, (1990).

Schapire et al., "Boosting the margin: A new explanation for the effectiveness of voting methods," Annals of Statistics, 26(5), 1651-1686, (1998).

Schapire, "Explaining AdaBoost," Empirical Inference: Festschrift in Honor of Vladimir N. Vapnik, 37-52, (Jan. 1, 2013).

Schwenk et al., "Boosting Neural Networks," Neural Computation, 12, 1869-1887, (Sep. 2000).

International Search Report and Written Opinion for PCT/US2024/021587 mailed Jul. 10, 2024.

\* cited by examiner

ENSEMBLE OF DEEP LEARNING MODELS FOR DEFECT REVIEW IN HIGH VOLUME MANUFACTURING

BACKGROUND OF THE INVENTION

1. Field of the Invention

The present invention generally relates to methods and systems for detecting defects in images of a specimen. Certain embodiments relate to an ensemble of deep learning models for high accuracy and high throughput scanning electron microscope (SEM) defect review in high volume manufacturing.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on specimens to drive higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail.

Defect review typically involves re-detecting defects detected as such by an inspection process and generating additional information about the defects at a higher resolution using either a high magnification optical system or a scanning electron microscope (SEM). Defect review is therefore performed at discrete locations on specimens where defects have been detected by inspection. The higher resolution data for the defects generated by defect review is more suitable for determining attributes of the defects such as profile, roughness, more accurate size information, etc. Defects can generally be more accurately classified into defect types based on information determined by defect review compared to inspection.

Metrology processes are also used at various steps during a semiconductor manufacturing process to monitor and control the process. Metrology processes are different than inspection processes in that, unlike inspection processes in which defects are detected on a specimen, metrology processes are used to measure one or more characteristics of the specimen that cannot be determined using currently used inspection tools. For example, metrology processes are used to measure one or more characteristics of a specimen such as a dimension (e.g., line width, thickness, etc.) of features formed on the specimen during a process such that the performance of the process can be determined from the one or more characteristics. In addition, if the one or more characteristics of the specimen are unacceptable (e.g., out of a predetermined range for the characteristic(s)), the measurements of the one or more characteristics of the specimen may be used to alter one or more parameters of the process such that additional specimens manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a specimen may be independent of the results of an inspection process performed on the specimen. In particular, the locations at which a metrology process is performed may be selected independently of inspection results. In addition, since locations on the specimen at which metrology is performed may be selected independently of inspection results, unlike defect review in which the locations on the specimen at which defect review is to be performed cannot be determined until the inspection results for the specimen are generated and available for use, the locations at which the metrology process is performed may be determined before an inspection process has been performed on the specimen.

Figure 1:
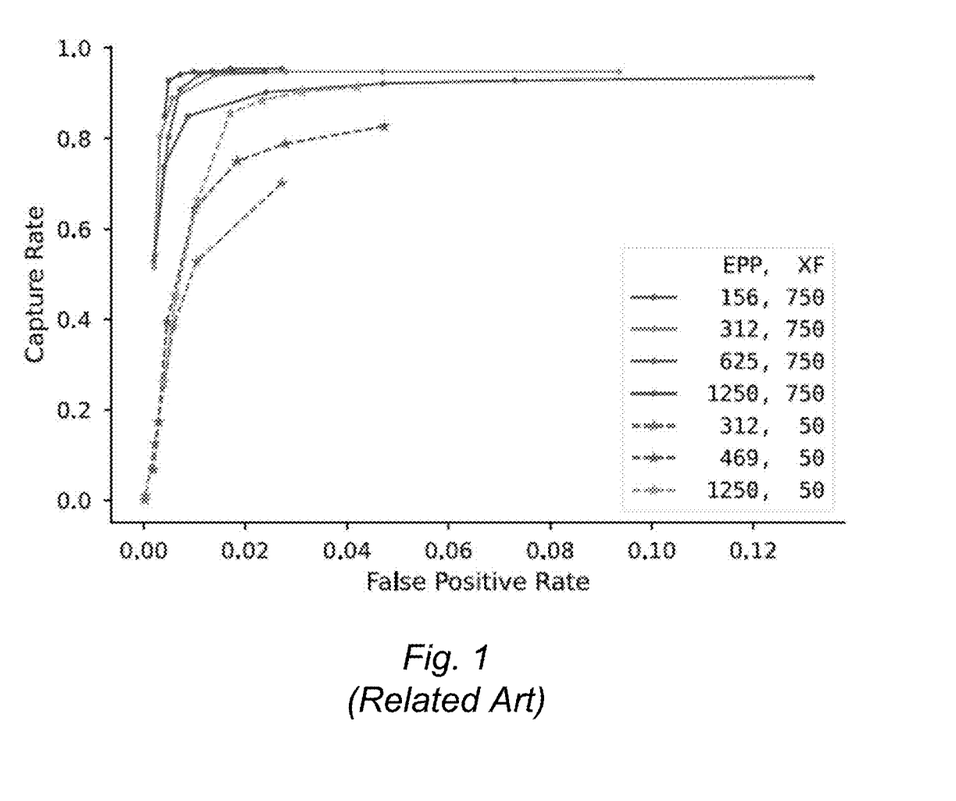
FIG. 1 is a plot of receiver operating characteristic (ROC) curves for a trained neural network that detects defects from scanning electron microscope (SEM) images of a backend layer.

Advances in deep learning have made deep learning an attractive framework for use in processes such as those described above. For example, some inspection processes use a single convolutional neural network (CNN) for defect detection. In some such methods, the network is trained with a few hundred examples, and it achieves a false-positive rate of approximately 10-3 to capture at least 80% of the defects. FIG. 1 shows receiver operating characteristic (ROC) curves for an optimally trained neural network configured to detect defects from SEM images of a backend layer. Each curve represents different imaging conditions (EPP=electrons per pixel, XF=extraction field). To capture 80% or more defects, this network must operate at a false positive rate of at least 0.3%.

In such methods, a single neural network may be trained with positive and negative examples and the corresponding labels. The labels are images with the value 0 everywhere except over a relatively small region enclosing the defect. Therefore, all negative examples are entirely zero. The network may include 6 or more convolutional layers and outputs a real-valued array of the same size as the input images. The network is trained by minimizing the cross-entropy between the network output and the label. Therefore, the network is trained to produce images closely matching the label.

Inference is performed using SEM images from multiple detectors of a SEM, and a binary image of the design pattern corresponding to the imaged location. This data is input to the neural network as a three-dimensional array in which the third dimension enumerates the multiple detector view of the image as well as the design clip. The network outputs a two-dimensional array of the same size as the input SEM images. This output assigns a number between 0 and 1 to each pixel such that pixels with values close to 0 are unlikely to belong to a defect while those close to 1 are deemed highly likely to belong to a defect. A single threshold, T, is selected and the image is binarized as follows: for each pixel, if its value is below T, it is reassigned a value of 0, otherwise it is assigned a value of 1.

Connected pixels of value 1 are grouped to reduce the impact of shot noise. If the image after these operations contains any regions with value 1, it is classified as that of a defective site. Otherwise, it is ignored, and the corresponding site classified as non-defective.

The currently used methods described above have a number of important disadvantages. For example, the currently used methods are intended for the research and development phase in semiconductor fabrication facilities and not for high volume manufacturing (HVM). As a result, their performance is far below that required by the rarity of defects in a mature process of HVM. Specifically, their false positive rate is approximately 100 times larger than required for review in HVM. In addition, there is no theoretical foundation or principle that ensures the methods' performance increases with an increase in computational resources. Furthermore, the currently used methods are extremely sensitive to the choice of optimizer parameters and require their expensive tuning.

Accordingly, it would be advantageous to develop systems and methods for detecting defects in images of a specimen that do not have one or more of the disadvantages described above.

SUMMARY OF THE INVENTION

The following description of various embodiments is not to be construed in any way as limiting the subject matter of the appended claims.

One embodiment relates to a system configured to detect defects in images of a specimen. The system includes a computer subsystem and one or more components executed by the computer subsystem that include an ensemble of deep learning (DL) models and a pseudo-loss function based on output generated by the ensemble of DL models. The computer subsystem is configured for training the ensemble with a training dataset that includes training specimen images and training labels indicating if a defect is detected in the training specimen images. The training includes altering one or more parameters of the ensemble until the pseudo-loss function determined based on the output of the ensemble is approximately equal to but not greater than 0.5. The computer subsystem is also configured for detecting defects in runtime specimen images by inputting the runtime specimen images into the trained ensemble of DL models and generating runtime labels for the runtime specimen images indicating if a defect has been detected in the runtime specimen images based on outputs of the DL models in the trained ensemble. The system may be further configured as described herein.

Another embodiment relates to a computer-implemented method for detecting defects in images of a specimen. The method includes the training and detecting steps described above, which are performed by a computer subsystem. Each of the steps of the method may be performed as described further herein. The method described above may include any other step(s) of any other method(s) described herein and may be performed by any of the systems described herein.

Another embodiment relates to a non-transitory computer-readable medium storing program instructions executable on a computer system for performing a computer-implemented method for detecting defects in images of a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for determining information for a specimen for defect review applications, e.g., detecting defects in images of a specimen, and/or possibly other semiconductor-based applications such as metrology and inspection. For example, the embodiments described herein provide an ensemble of deep learning (DL) models such as deep neural networks for high accuracy and high throughput scanning electron microscope (SEM) or other defect review in high volume manufacturing (HVM). In one embodiment, the runtime specimen images input to a trained ensemble of DL models are generated during a defect review process performed on the specimen in an HVM process. In another embodiment, the training specimen images and the runtime specimen images are generated by an imaging subsystem of a defect review tool. In a further embodiment, the training specimen images and the runtime specimen images are generated by an electron beam-based imaging subsystem. In an additional embodiment, the runtime specimen images input into the trained ensemble of DL models for any one location on the specimen include images generated with multiple detectors of an imaging subsystem. All of these images may be generated as described further herein by the imaging subsystems and tools described herein.

Optical inspection of patterned semiconductor wafers is performed at wavelengths that far exceed the sizes of the defects to be detected. This is necessitated by the fact that wafer materials interact strongly only to the light of wavelengths approximately 100 nm and above. Furthermore, optical inspection remains the only technology that can scan an entire wafer within 1 hour without damaging it. This throughput requirement is essential in maintaining the yield necessary to maintain the economy of HVM.

As a result, unresolved optical images are used as the first and necessary filter in defect detection. The presence of defects in these images is generally determined from statistical anomaly detection algorithms. These algorithms must accept many false detections to find the few subtle defects on the entire wafer. To separate the true detections from the false detections, a high resolution SEM is used to image the sites flagged by optical inspection. Due to the substantially small size of the defects, the number of sites flagged are expected to be several million. Therefore, an automated algorithm is necessary to review 1-5 million SEM images.

A "high volume manufacturing process" as that term is used herein is defined as a process that is not in the research and development phase but has been released for high volume production of semiconductor devices due to it relatively well-controlled nature, which may have been established through research and development or some other means. In HVM, the process is mature enough that the defects of interest (DOIs) are rare. They may range from 10-100 DOIs occurring randomly on the wafer. Therefore, the automated review algorithm must correctly identify 10-100 images containing a defect. To facilitate human review of its output, the algorithm must not produce more than about 100 false positives.

In light of the above considerations, the embodiments described herein were created to provide a detection technology that can be used to satisfy one or more of the following requirements. One requirement is that a true defect in a SEM image has a greater than 80% probability of being captured. Another requirement is that the probability of making a false positive detection, i.e., reporting a defect when none is present, is less than 10-5. The defect review must be completed in less than 1 hour. An additional requirement is that it must be possible to train the defect review method with approximately 100 positive and negative examples of defects. Furthermore, the algorithm performance should demonstrably increase with an increase in computational resources.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

Figure 2:
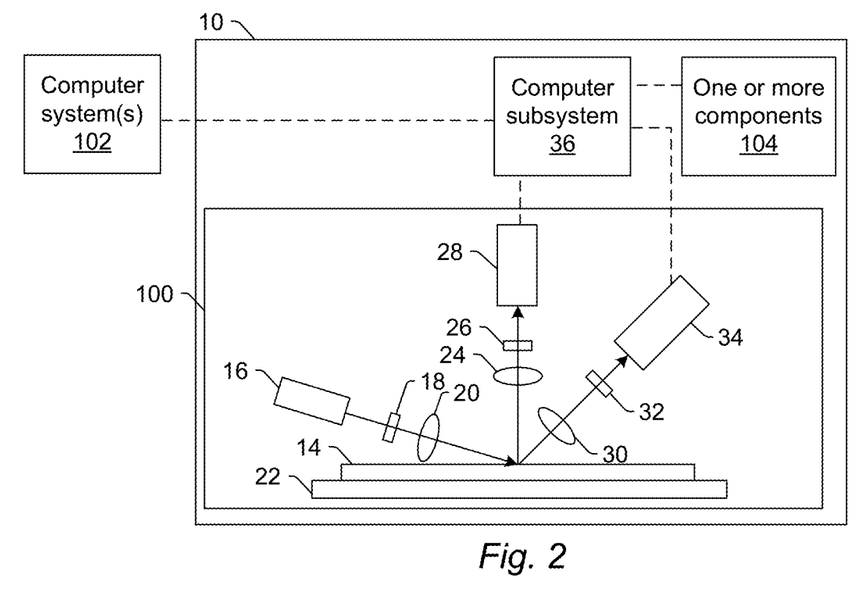
FIGS. 2 and 2a are schematic diagrams illustrating side views of embodiments of a system configured as described herein.

One embodiment of a system configured for detecting defects in images of a specimen is shown in FIG. 2. In some embodiments, system 10 includes imaging subsystem 100. The imaging subsystem includes and/or is coupled to a computer subsystem, e.g., computer subsystem 36 and/or one or more computer systems 102. In general, the imaging subsystems described herein include at least an energy source, a detector, and a scanning subsystem. The energy source is configured to generate energy that is directed to a specimen by the imaging subsystem. The detector is configured to detect energy from the specimen and to generate output responsive to the detected energy. The scanning subsystem is configured to change a position on the specimen to which the energy is directed and from which the energy is detected. In one embodiment, as shown in FIG. 2, the imaging subsystem is configured as a light-based imaging subsystem.

In the light-based imaging subsystems described herein, the energy directed to the specimen includes light, and the energy detected from the specimen includes light. For example, as shown in FIG. 2, the imaging subsystem includes an illumination subsystem configured to direct light to specimen 14. The illumination subsystem includes at least one light source, e.g., light source 16. The illumination subsystem is configured to direct the light to the specimen at one or more angles of incidence, which may include one or more oblique angles and/or one or more normal angles. For example, as shown in FIG. 2, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the process being performed on the specimen.

The illumination subsystem may be configured to direct the light to the specimen at different angles of incidence at different times. For example, the imaging subsystem may be configured to alter one or more characteristics of one or more elements of the illumination subsystem such that the light can be directed to the specimen at an angle of incidence that is different than that shown in FIG. 2. In one such example, the imaging subsystem may be configured to move light source 16, optical element 18, and lens 20 such that the light is directed to the specimen at a different oblique angle of incidence or a normal (or near normal) angle of incidence.

In some instances, the imaging subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 2 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 2) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as any suitable laser known in the art configured to generate light at any suitable wavelength(s). The laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 2 as a single refractive optical element, in practice, lens 20 may include a number of refractive and/or reflective optical elements that in combination focus the light from the optical element to the specimen. The illumination subsystem shown in FIG. 2 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for imaging.

The imaging subsystem may also include a scanning subsystem configured to change the position on the specimen to which the light is directed and from which the light is detected and possibly to cause the light to be scanned over the specimen. For example, the imaging subsystem may include stage 22 on which specimen 14 is disposed during imaging. The scanning subsystem may include any suitable mechanical and/or robotic assembly (that includes stage 22) that can be configured to move the specimen such that the light can be directed to and detected from different positions on the specimen. In addition, or alternatively, the imaging subsystem may be configured such that one or more optical elements of the imaging subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The imaging subsystem further includes one or more detection channels. At least one of the detection channel(s) includes a detector configured to detect light from the specimen due to illumination of the specimen by the imaging subsystem and to generate output responsive to the detected light. For example, the imaging subsystem shown in FIG. 2 includes two detection channels, one formed by collector 24, element 26, and detector 28 and another formed by collector 30, element 32, and detector 34. As shown in FIG. 2, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 2, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 2 shows an embodiment of the imaging subsystem that includes two detection channels, the imaging subsystem may include a different number of detection channels (e.g., only one detection channel or two or more detection channels). In one such instance, the detection channel formed by collector 30, element 32, and detector 34 may form one side channel as described above, and the imaging subsystem may include an additional detection channel (not shown) formed as another side channel that is positioned on the opposite side of the plane of incidence. Therefore, the imaging subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the imaging subsystem may also include two or more side channels configured as described above. As such, the imaging subsystem may include at least three channels (i.e., one top channel and two side channels), and each of the at least three channels has its own collector, each of which is configured to collect light at different scattering angles than each of the other collectors.

As described further above, each of the detection channels included in the imaging subsystem may be configured to detect scattered light. Therefore, the imaging subsystem shown in FIG. 2 may be configured for dark field (DF) imaging of specimens. However, the imaging subsystem may also or alternatively include detection channel(s) that are configured for bright field (BF) imaging of specimens. In other words, the imaging subsystem may include at least one detection channel that is configured to detect light specularly reflected from the specimen. Therefore, the imaging subsystems described herein may be configured for only DF, only BF, or both DF and BF imaging. Although each of the collectors are shown in FIG. 2 as single refractive optical elements, each of the collectors may include one or more refractive optical elements and/or one or more reflective optical elements.

The one or more detection channels may include any suitable detectors known in the art such as photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels of the imaging subsystem may be signals or data, but not image signals or image data. In such instances, a computer subsystem such as computer subsystem 36 may be configured to generate images of the specimen from the non-imaging output of the detectors. However, in other instances, the detectors may be configured as imaging detectors that are configured to generate imaging signals or image data. Therefore, the imaging subsystem may be configured to generate images in a number of ways.

FIG. 2 is provided herein to generally illustrate a configuration of an imaging subsystem that may be included in the system embodiments described herein. Obviously, the imaging subsystem configuration described herein may be altered to optimize the performance of the imaging subsystem as is normally performed when designing a commercial imaging system. In addition, the systems described herein may be implemented using an existing system (e.g., by adding functionality described herein to an existing inspection system) such as tools that are commercially available from KLA Corp., Milpitas, Calif. For some such systems, the methods described herein may be provided as optional functionality of the system (e.g., in addition to other functionality of the system). Alternatively, the system described herein may be designed "from scratch" to provide a completely new system.

Computer subsystem 36 may be coupled to the detectors of the imaging subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors. For instance, if the system is configured as a defect review system, the computer subsystem may be configured to detect defects on the specimen using the output of the detectors. Detecting the defects on the specimen may be performed as described further herein.

Computer subsystem 36 may be further configured as described herein. For example, computer subsystem 36 may be configured to perform the steps described herein. As such, the steps described herein may be performed "on-tool," by a computer subsystem that is coupled to or part of an imaging subsystem. In addition, or alternatively, computer system(s) 102 may perform one or more of the steps described herein. Therefore, one or more of the steps described herein may be performed "off-tool," by a computer system that is not directly coupled to an imaging subsystem.

Computer subsystem 36 (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 2 by any suitable transmission media, which may include any suitable wired and/or wireless transmission media known in the art. Two or more of such computer subsystems may also be effectively coupled by a shared computer-readable storage medium (not shown).

Although the imaging subsystem is described above as being an optical or light-based imaging subsystem, in another embodiment, the imaging subsystem is configured as an electron beam imaging subsystem. In an electron beam imaging subsystem, the energy directed to the specimen includes electrons, and the energy detected from the specimen includes electrons. In one such embodiment shown in FIG. 2a, the imaging subsystem includes electron column 122, and the system includes computer subsystem 124 coupled to the imaging subsystem. Computer subsystem 124 may be configured as described above. In addition, such an imaging subsystem may be coupled to another one or more computer systems in the same manner described above and shown in FIG. 2.

Figure 2A:
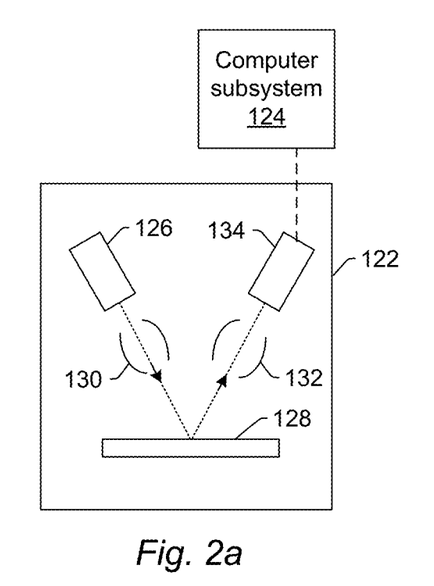

As also shown in FIG. 2a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2a as being configured such that the electrons are directed to the specimen at an oblique angle of incidence and are scattered from the specimen at another oblique angle, the electron beam may be directed to and scattered from the specimen at any suitable angles. In addition, the electron beam imaging subsystem may be configured to use multiple modes to generate output for the specimen as described further herein (e.g., with different illumination angles, collection angles, etc.). The multiple modes of the electron beam imaging subsystem may be different in any output generation parameters of the imaging subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to detect defects on the specimen using output generated by detector 134, which may be performed as described further herein. Computer subsystem 124 may be configured to perform any additional step(s) described herein. A system that includes the imaging subsystem shown in FIG. 2a may be further configured as described herein.

FIG. 2a is provided herein to generally illustrate a configuration of an electron beam imaging subsystem that may be included in the embodiments described herein. As with the optical imaging subsystem described above, the electron beam imaging subsystem configuration described herein may be altered to optimize the performance of the imaging subsystem as is normally performed when designing a commercial system. In addition, the systems described herein may be implemented using an existing system (e.g., by adding functionality described herein to an existing system) such as tools that are commercially available from KLA. For some such systems, the methods described herein may be provided as optional functionality of the system (e.g., in addition to other functionality of the system). Alternatively, the system described herein may be designed "from scratch" to provide a completely new system.

Although the imaging subsystem is described above as being a light or electron beam imaging subsystem, the imaging subsystem may be an ion beam imaging subsystem. Such an imaging subsystem may be configured as shown in FIG. 2a except that the electron beam source may be replaced with any suitable ion beam source known in the art. In addition, the imaging subsystem may include any other suitable ion beam imaging system such as those included in commercially available focused ion beam (FIB) systems, helium ion microscopy (HIM) systems, and secondary ion mass spectroscopy (SIMS) systems.

As further noted above, the imaging subsystem may be configured to have multiple modes. In general, a "mode" is defined by the values of parameters of the imaging subsystem used to generate output for the specimen. Therefore, modes that are different may be different in the values for at least one of the imaging parameters of the imaging subsystem (other than position on the specimen at which the output is generated). For example, for a light-based imaging subsystem, different modes may use different wavelengths of light. The modes may be different in the wavelengths of light directed to the specimen as described further herein (e.g., by using different light sources, different spectral filters, etc. for different modes). In another embodiment, different modes may use different illumination channels. For example, as noted above, the imaging subsystem may include more than one illumination channel. As such, different illumination channels may be used for different modes.

The multiple modes may also be different in illumination and/or collection/detection. For example, as described further above, the imaging subsystem may include multiple detectors. Therefore, one of the detectors may be used for one mode and another of the detectors may be used for another mode. Furthermore, the modes may be different from each other in more than one way described herein (e.g., different modes may have one or more different illumination parameters and one or more different detection parameters).

The imaging subsystem may be configured to scan the specimen with the different modes in the same scan or different scans, e.g., depending on the capability of using multiple modes to scan the specimen at the same time.

In some instances, the systems described herein may be configured as defect review systems. However, the systems described herein may be configured as another type of semiconductor-related quality control type system such as an inspection system and a metrology system. For example, the embodiments of the imaging subsystems described herein and shown in FIGS. 2 and 2a may be modified in one or more parameters to provide different imaging capability depending on the application for which they will be used. In one embodiment, the imaging subsystem is configured as an electron beam defect review subsystem. For example, the imaging subsystem shown in FIG. 2a may be configured to have a higher resolution if it is to be used for defect review or metrology rather than for inspection. In other words, the embodiments of the imaging subsystem shown in FIGS. 2 and 2a describe some general and various configurations for an imaging subsystem that can be tailored in a number of manners that will be obvious to one skilled in the art to produce imaging subsystems having different imaging capabilities that are more or less suitable for different applications.

As noted above, the imaging subsystem may be configured for directing energy (e.g., light, electrons) to and/or scanning energy over a physical version of the specimen thereby generating actual images for the physical version of the specimen. In this manner, the imaging subsystem may be configured as an "actual" imaging system, rather than a "virtual" system. However, a storage medium (not shown) and computer subsystem(s) 102 shown in FIG. 2 may be configured as a "virtual" system. In particular, the storage medium and the computer subsystem(s) are not part of imaging subsystem 100 and do not have any capability for handling the physical version of the specimen but may be configured as a virtual inspector that performs inspection-like functions, a virtual metrology system that performs metrology-like functions, a virtual defect review tool that performs defect review-like functions, etc. using stored detector output. Systems and methods configured as "virtual" systems are described in commonly assigned U.S. Pat. No. 8,126,255 issued on Feb. 28, 2012 to Bhaskar et al., U.S. Pat. No. 9,222,895 issued on Dec. 29, 2015 to Duffy et al., and U.S. Pat. No. 9,816,939 issued on Nov. 14, 2017 to Duffy et al., which are incorporated by reference as if fully set forth herein. The embodiments described herein may be further configured as described in these patents. For example, a computer subsystem described herein may be further configured as described in these patents.

The system includes a computer subsystem, which may include any configuration of any of the computer subsystem(s) or system(s) described above, and one or more components executed by the computer subsystem. For example, as shown in FIG. 2, the system may include computer subsystem 36 and one or more components 104 executed by the computer subsystem.

Figure 3:
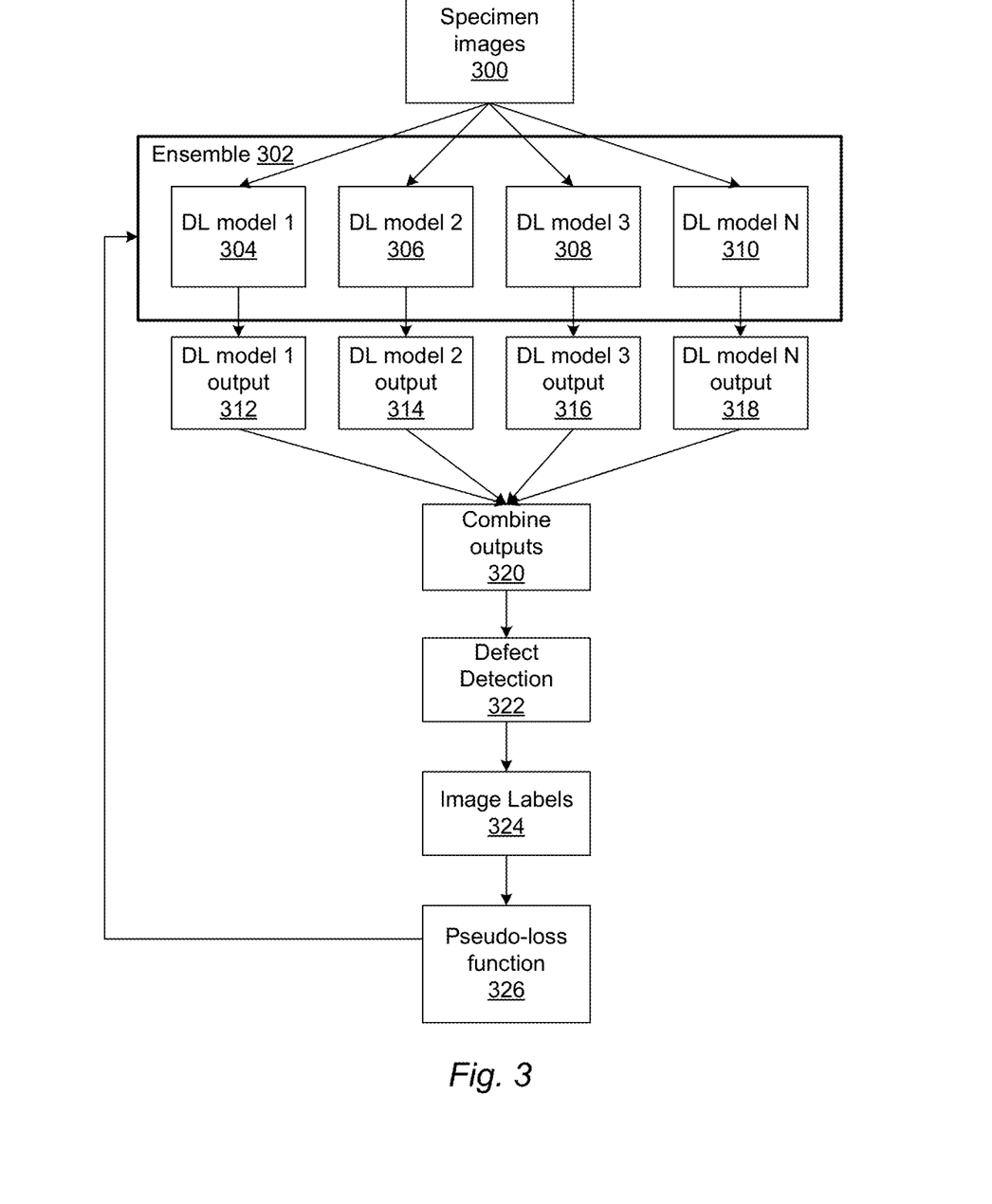
FIG. 3 is a block diagram illustrating an embodiment of one or more components that may be executed by a computer subsystem of the system embodiments.

As shown in FIG. 3, the one or more components include ensemble 302 of deep learning (DL) models and pseudo-loss function 326 based on output generated by the ensemble of DL models. Ensemble 302 may include, for example, DL model 1 (304), DL model 2 (306), DL model 3 (308), ..., and DL model N (310). Although at least four DL models are shown in FIG. 3, the one or more components may include any suitable number of DL models, e.g., two or more DL models, more than four DL models, etc. The DL models do not model any physical process. Instead, the DL models are trained to determine information from the input image(s) in a generative rather than a deterministic manner.

Each of the DL models may have or include any suitable DL architecture such as a convolutional neural network (CNN) architecture. The CNNs may have any suitable architecture known in the art. In addition, the CNN architecture of each of the DL models may be the same or different. In other words, one or more of the DL models may have the same CNN architecture and/or one or more of the DL models may have different CNN architectures. If one or more of the DL models is or includes a CNN, each of the CNN(s) may include any suitable types of layers such as convolution, pooling, fully connected, soft max, etc., layers having any suitable configuration known in the art. In one embodiment, each of the DL models includes 6 convolutional layers and about 100,000 parameters. For example, relatively small neural networks with 6 convolutional layers and approximately 100,000 parameters per network may be used.

The DL models are configured as an ensemble of models. In some embodiments, the outputs of each of the DL models in the trained ensemble are a same type of information for the runtime specimen images. An "ensemble of models" is defined herein as a group of individual DL models trained either independently or jointly for solving a common task. In other words, the DL models are not configured for determining different information for the specimen. In some applications in which the embodiments described herein may be used, the common task is predicting defect locations on a specimen.

The embodiments described herein may have one or more of the following new features. For example, in one embodiment, a sequence of weight and bias matrices represent layers of each of the DL models. In another embodiment, the training described further herein includes determining the pseudo-loss function for each of the DL models in the ensemble and each sample in a training dataset used in the training. In this manner, the embodiments may include a function to evaluate the pseudo-loss for each training sample. In another embodiment, the computer subsystem is configured for computing a probability weight for each of multiple samples in the training dataset and selecting a portion of the multiple samples used for the training based on the computed probability weight for each of the multiple samples. For example, the embodiments described herein may be configured for computation of the probability weight for each training sample and may include a function from which training samples are drawn with the computed probability. In an additional embodiment, the outputs of the DL models in the trained ensemble include two-dimensional (2D) probability map outputs, and generating runtime labels includes generating a 2D weighted average map from the 2D probability map outputs and assigning the runtime labels based on whether the 2D weighted average map contains one or more detections that meet predetermined threshold and size criteria. For example, the embodiments may include a function that composes 2D probability map outputs of each network into a 2D weighted average map and a decision function that outputs a 0 or 1 based on whether the weighted average map contains one or more detections that meet both the threshold and the size criteria.

The embodiments may have two phases: training and inference.

The computer subsystem is configured for training the ensemble with a training dataset including training specimen images and training labels indicating if a defect is detected in the training specimen images. In one embodiment, the training specimen images include less than 150 positive and negative examples of defects. For example, during training, a dataset with approximately 100 images of non-defective sites and 20 or more images of defective sites may be compiled. During training, specimen images 300 may include the training specimen images, which may be input to ensemble 302 with any other training data in the training dataset. The computer subsystem may input the training specimen images and any other information described herein to the ensemble of DL models in any suitable manner known in the art.

The computer subsystem may acquire or generate the training specimen images as described further herein, which are input to the DL models by the computer subsystem. For example, the training specimen images may be generated by the imaging subsystem and/or computer subsystem as described further herein. Each image may be manually reviewed to construct labels for the training specimen images. Labels may be binary images of the same size as the images in the dataset. The pixels in a label take zero values everywhere except in a rectangular region, which when placed over the actual image, encloses the defect. Therefore, all negative examples have labels that are entirely zero.

The images that are input to each of the DL models may be the same. In other words, all of the training specimen images may be input to each of the DL models. However, the manner in which each of the DL models uses the training specimen images may be different. In other words, the DL models do not necessarily have the same architecture configurations with the same parameters (but they may have the same architecture configurations with different parameters, different architectures, etc.). In this manner, the DL models may not be simply multiple instances of the same DL model. In any case, the inputs to each of the DL models will be the same, and the outputs of each of the DL models will be the same type of information even if different DL models produce different results.

Training performed with the training dataset may otherwise be performed in any suitable manner known in the art. The objective of the training of a DL model in the ensemble is to reduce the pseudo-loss function below the value of 0.5 but not too far below, e.g., not below 0.4. For example, the training includes altering one or more parameters of the ensemble until the pseudo-loss function determined based on the output of the ensemble is approximately equal to but not greater than 0.5. One important new feature of the embodiments described herein is the pseudo-loss function that plays an essential role in suppressing probability of false positives while maintaining a desired probability of true detections. Another important new feature of the embodiments described herein is that they include an ensemble of DL models that are individually of high accuracy in one measure and low in a pseudo-loss measure.

The performance of the embodiments described herein depends significantly on the pseudo-loss function defined as a function of the input, x, and a parameter $\xi$ as follows, $$\rho(x;\xi) = 1 + \frac{\tau(x)}{\xi + \tau(x)} +$$

$$\Theta(\psi(x) - 0^+)\left[\frac{\xi}{\xi + \omega(x)} - \frac{\omega(x)}{\psi(x)}\right] - \Theta(0^+ - \psi(x))\left[\frac{\xi}{\xi + n_P - \tau(x)}\right]$$

The quantities on the right-hand side are defined as follows, $$\psi(x) = \sum_{ij} C_{ij}(x)$$

$$\tau(x) = \sum_{ij} (1 - C_{ij}(x))[P(x)]_{ij}$$

$$\omega(x) = \sum_{ij} C_{ij}(x)[P(x)]_{ij}$$

In the above equations, C(x) is a 2D array of the same size as x and represents the label described above. P(x) is a 2D array that takes continuous values between 0 and 1 and represents the output of a single neural network. For example, as shown in FIG. 3, DL model 1 generates DL model 1 output (312), DL model 2 generates DL model 2 output (314), DL model 3 generates DL model 3 output (316), . . . , and DL model N generates DL model N output 318. These outputs may be the outputs of the individual DL models. The computer subsystem may combine the individual DL model outputs, as shown in step 320 in FIG. 3, and perform defect detection based on the combined outputs, as shown in step 322, both of which may be performed as described further herein. The computer subsystem may then generate image labels 324 based on the results of the defect detection, which during the training phase may be training image labels and may be generated as described further herein. The training image labels and the individual DL model outputs may then be input to pseudo-loss function 326. The pseudo-loss function value determined based on the training image labels and the individual DL model outputs may then be used to alter one or more parameters of the ensemble of DL models.

The form of the pseudo-loss function is of key importance to the embodiments described herein. For example, in one embodiment, the pseudo-loss function is configured so that a false positive defect detection continuously increases a value of the pseudo-loss function and a true defect detection reduces the value of the pseudo-loss function in proportion to a maximum size of the true defect detection. In this form of the pseudo-loss, any occurrence of false positives continuously increases the value of the function. A true detection $\omega>0$ reduces the value of $\rho$. The reduction is in proportion to the maximum size of the detection, which is the size of the label box. In this manner, the pseudo-loss function can provide the desired functionality of maintaining high penalty for false positives and zero penalty for true positives. In another embodiment, the pseudo-loss function is configured so that weak true detections and false positive detections affect the pseudo-loss function on a continuous scale. Thus, a weak true detection and any false detection is penalized on a continuous scale.

On the other hand, a weak detection is a valid detection, and a false positive in an image with a defect does not alter the total number of sites output for human review. Therefore, the observed performance of the ensemble in output counts may have significantly low false negative and positive rates, while its pseudo-loss function may remain high. Training the ensemble functions only when we have a relatively high pseudo-loss value for most of the training samples. The relatively high pseudo-loss value ensures that a large enough fraction of the training data is retained as the sequence of networks is trained. If this loss becomes too low, the ensemble training will stop with only a few samples with non-vanishing probability weights. The pseudo-loss function is computed for each DL model in the ensemble and each sample of the training data.

In some embodiments, the training includes hypothesis boosting. For example, a relatively large network with the same number of weights as the total number of weights in the ensemble has, in principle, the same capacity to learn. The distinguishing feature of the ensemble lies in the judicious partitioning of these weights into separate smaller networks, and then training them with a hypothesis boosting mechanism. A rigorous proof ensures that the probability of classification error of the hypothesis boosting mechanism reaches zero over the probability distribution of input.

In one embodiment, at least one of the DL models in the ensemble is configured as a weak learning algorithm. In another embodiment, the training includes hypothesis boosting. For example, training may implement two classes: WeakLearn and HypothesisBoosting. An instantiation of the class WeakLearn would instantiate a CNN of 6 layers. The instantiation may include components including: a member function to iterate through training data batches and compute an update to the weights based on the gradient averaged over the batch; a member function to compute gradients averaged over a batch and compute updates to the weights; and a member function to compute the pseudo-loss function once training is finished. Next, HypothesisBoosting may be implemented in any suitable manner known in the art. Each network $h_t$ and its corresponding scalar value $\beta_t$ is stored in any appropriate file format such as the HDF5 file format that is convenient for the embodiments described herein as it naturally saves arrays and scalar data.

During inference, the computer subsystem is configured for detecting defects in runtime specimen images by inputting the runtime specimen images into the trained ensemble of DL models and generating runtime labels for the runtime specimen images indicating if a defect has been detected in the runtime specimen images based on outputs of the DL models in the trained ensemble. For example, during inference, specimen images 300 shown in FIG. 3 are runtime specimen images input by the computer subsystem into ensemble 302 of DL models. Inference is performed by feeding the input images with the same number of channels (modes) of the imaging subsystem, image size, and with/ without design clips as the training dataset. The design clips may include any suitable design information known in the art. Each image is fed in parallel to each of the DL models (DL model 1 (304), . . . DL model N (310)), and their output (DL model 1 output (312), . . . , DL model N output (318)) may be collected as a list of 2D arrays. In one embodiment, the computer subsystem may combine the individual DL model outputs in step 320 using the formula below in which the DL models are enumerated by variable "t" that takes values from 1 to M. Here, "M" is the total size of the ensemble. We denote the output of DL model "t" by $h_t(x)$ when it is given the input "x." The final 2D image is computed according to the formula, $$H_M(x;\eta) = \frac{1}{2} + \frac{1}{2}\text{sgn}\left[\sum_{t=1}^{M} \log\left(\frac{1}{\beta_t}\right)\text{sgn}(h_t(x) - \eta)\right]$$

Here $\eta$ is the probability threshold, which is used to identify groups or regions of pixels with high likelihood of belonging to a defect region. The parameter $\beta_t$ is the weight assigned to the DL model "t" in the sequence to compute the weighted average. The computer subsystem may then perform defect detection step 322 based on $H_M$ resulting from step 320. In one such example, a pooling operation may be performed on $H_M$ to detect regions of size exceeding a user-defined size threshold. If the input is 1, the image is flagged as containing a defect. If the result is 0, it is ignored as the image of a non-defective site. Image labels 324, which during inference may be runtime image labels, may then be generated based on defect detection step 322. These image labels may be configured as described further herein.

In another embodiment, the outputs of the DL models in the trained ensemble include 2D probability map outputs, and generating the runtime labels includes computing a final scalar decision function on a combination of the 2D probability map outputs of each of the DL models in the trained ensemble. For example, the computer subsystem may compute a final scalar decision function, in defect detection step 322, on a composition of 2D probability maps of individual DL models, generated in combine outputs step 320 performed based on the individual DL model outputs. This contrasts with other considered approaches in which the final decision function is a linear combination of the scalar outputs of the same function applied to individual learners of the ensemble.

In one example implementation of the inference phase, at inference, $h_t$ and $\beta_t$ may be loaded for all $1 \leq t \leq M$ into the computer subsystem memory. The computer subsystem may then iterate through the dataset and prepare the three-dimensional (3D) array in which the last dimension represents SEM detection channels and the design channel if needed. The computer subsystem may implement a loop that loads and iterates through data and prepares the DL model inputs "x" following the above procedure. After loading "x," a copy of "x" is input to each DL model, and the computer subsystem collects the "M" results $z_t = h_t(x)$. The pairs $(z_t, \beta_t)$ are then collected and substituted into a function. Multiple copies of each DL model may be loaded into the computer subsystem. In this case, many inputs can be processed in parallel. This is another key distinction with respect to a single, relatively large neural network, in which a single input is processed sequentially. In contrast, an ensemble processes each input into individual entities.

The embodiments described herein have a number of significant advantages and improvements over currently used methods and systems for detecting defects in images of a specimen. For example, the embodiments described herein can meet the high accuracy and throughput requirements of HVM. In addition, the embodiments described herein can achieve an improvement in false positive rates below $2 \times 10^{-5}$ on a variety of datasets. The embodiments may also perform training based on a systematic procedure theoretically proven to reduce classification error as a polynomial function of increases in data and time. The performance of the embodiments described herein also does not depend strongly on tuning of the optimizer parameters, which eliminates an expensive and necessary step of the existing method. In other words, the embodiments described herein advantageously have a relatively low sensitivity to optimizer fine-tuning. The performance of the embodiments described herein does not depend sensitively on the architecture of individual DL models. Furthermore, the ensemble of DL models described herein is demonstrably robust against nearly 10 times increase in shot noise of the images input to the ensemble. In other words, the embodiments described herein advantageously have a relatively low sensitivity to shot noise.

The embodiments described herein therefore advantageously eliminate one of the highest risks in massive defect review in semiconductor chip manufacturing. In particular, as described further herein, massive defect review by SEM is an essential component used with high throughput optical inspection that is key to achieving economy of scale in the semiconductor industry. The embodiments described herein provide a key technology that can be used to enable the review of 5 million sites per hour.

Figure 4:
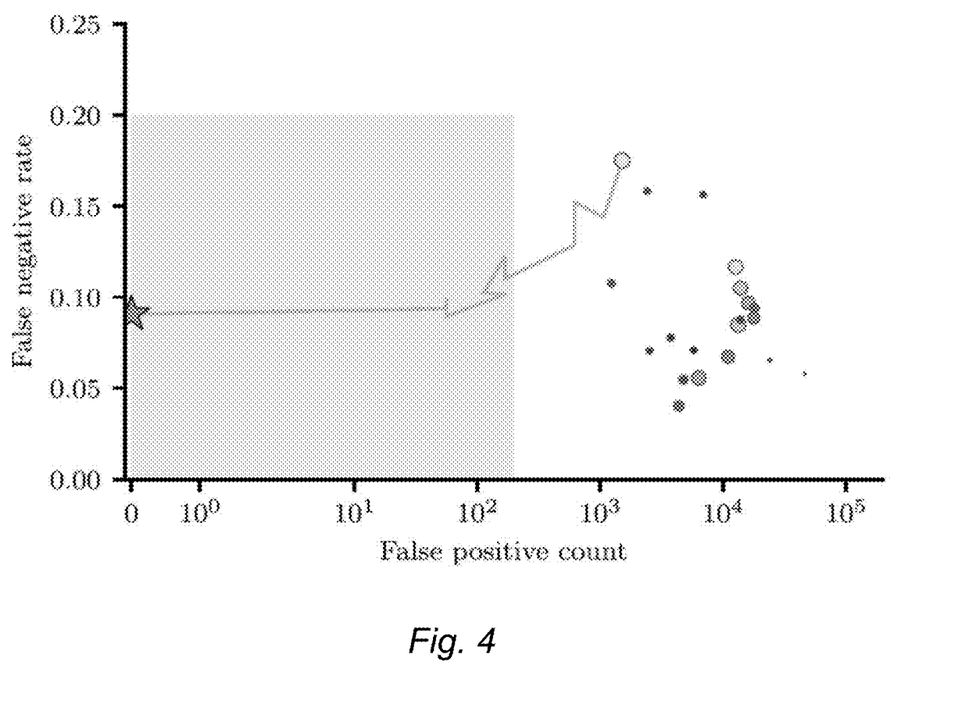
FIG. 4 is a plot of an example of defect detection results with SEM images from a backend layer achieved by the embodiments described herein.

FIG. 4 demonstrates how the ensemble improves the results by combining DL model outputs according to the boosting procedure. In particular, FIG. 4 shows an example of detecting defects with SEM images from a backend layer. The dots indicate the results for individual DL models in an ensemble, and the final weighted result is represented by the star-shaped marker. The gray trajectory indicates how the performance improves as M increases from 1 to the maximum size of the ensemble. The size of the dots indicates their weight, and the shading their place in the sequence, i.e., "t." The gray region is the desired performance, which is met by the ensemble.

In this figure, the false positive count is out of 5 million, and the false negative rate is equal to the number of known defects missed divided by the total number of known defects in the dataset. The target performance for HVM is in the gray region. None of the individual DL models achieve high performance, but due to their training in a sequence where each learns on the mistakes of its predecessor, the combined result improves remarkably. In some instances, the embodiments described herein can advantageously provide nearly linear scaling of false positive error with size of the ensemble.

Figure 5:
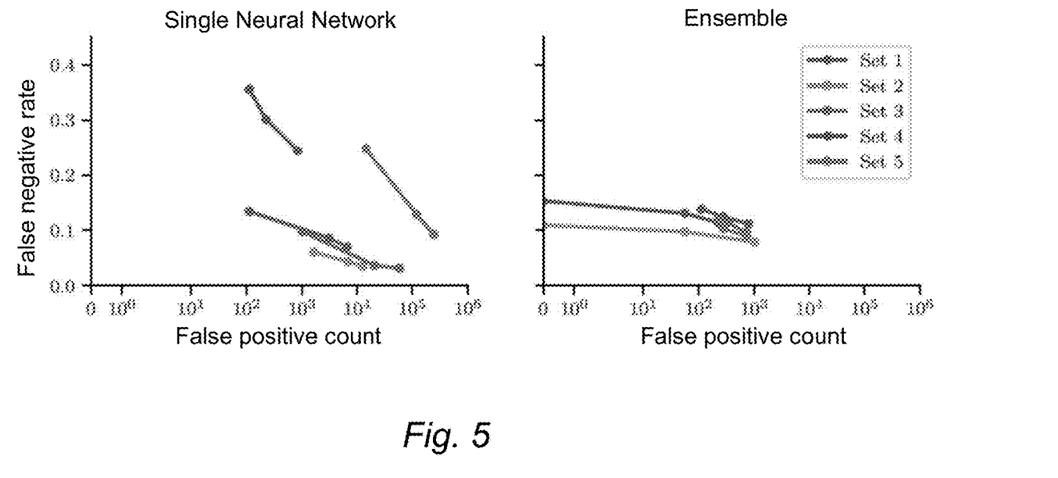
FIG. 5 is a plot of an example of the sensitivity of performance to hyperparameter tuning for a single neural network and an embodiment of the ensemble of DL models described herein.

In one embodiment, the training does not include optimizer hyper-parameter tuning of any of the DL models in the ensemble. FIG. 5 shows how optimizer hyper-parameter tuning is not necessary for the ensemble described herein. In particular, FIG. 5 shows the sensitivity of performance to hyper-parameter tuning for a single neural network (left) and an ensemble of neural networks (right). The 5 sets of hyperparameters are indicated consistently on the two plots. We note the much larger spread in false negatives and positives of a single neural network. The ensemble also has 0 false positive counts with sets 2 and 4, but otherwise varies much less from one set to another. The lines with each set are traced out by changing detection thresholds.

Optimizer hyper-parameter tuning is an extremely expensive step as it requires many iterations of a full training loop. In the case of a single network, it clearly makes a significant difference, and the optimal hyper-parameters must be searched for. FIG. 5 shows how the false negative and positive rates change for 5 different sets of hyper-parameters. The lines in the figures are traced out by changing detection thresholds. In the case of the ensemble, there is only a weak dependence. This indicates that any reasonable set of hyper-parameters of an optimizer can be a good starting point.

As an alternative to the embodiments described herein, a relatively large neural network may be constructed with the number of parameters equal to the total number of parameters in the entire ensemble. This network would have the same capacity as the ensemble and in principle can achieve the same performance. However, unlike the hypothesis boosting mechanism in ensemble approach of the embodiments described herein, no systematic procedure exists to train this relatively large network with probabilistic guarantees on training error.

The computer subsystem may also be configured for generating results that include information for the defects detected in the images of the specimen, which may include any of the results or information described herein. The results may be generated by the computer subsystem in any suitable manner. All of the embodiments described herein may be configured for storing results of one or more steps of the embodiments in a computer-readable storage medium. The results may include any of the results described herein and may be stored in any manner known in the art. The results may have any suitable form or format such as a standard file type. The storage medium may include any storage medium described herein or any other suitable storage medium known in the art.

After the results have been stored, the results can be accessed in the storage medium and used by any of the method or system embodiments described herein, formatted for display to a user, used by another software module, method, or system, etc. to perform one or more functions for the specimen or another specimen of the same type. For example, results produced by the computer subsystem described herein may include information for any defects detected on the specimen such as location, etc., of the bounding boxes of the detected defects, detection scores, information about defect classifications such as class labels or IDs, any defect attributes determined from any of the images, or any other such suitable information known in the art. That information may be used by the computer subsystem or another system or method for performing additional functions for the specimen and/or the detected defects such as sampling the defects for defect analysis, determining a root cause of the defects, etc.

Such functions also include, but are not limited to, altering a process such as a fabrication process or step that was or will be performed on the specimen in a feedback or feedforward manner, etc. For example, the computer subsystem may be configured to determine one or more changes to a process that was performed on the specimen and/or a process that will be performed on the specimen based on the defect detection results. The changes to the process may include any suitable changes to one or more parameters of the process. In one such example, the computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to both the computer subsystem and the semiconductor fabrication system. The semiconductor fabrication system may or may not be part of the system embodiments described herein. For example, the imaging subsystem and/or the computer subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments described above may be combined together into one single embodiment. In other words, unless otherwise noted herein, none of the embodiments are mutually exclusive of any other embodiments.

Another embodiment relates to a computer-implemented method for detecting defects in images of a specimen. The method includes the training and detecting steps described further herein. These steps are performed by a computer system, which may be configured according to any of the embodiments described herein. Each of the steps of the method may be performed as described further herein. The method may also include any other step(s) that can be performed by the imaging subsystem, computer subsystem, and/or ensemble of DL models described herein. In addition, the method described above may be performed by any of the system embodiments described herein.

Figure 6:
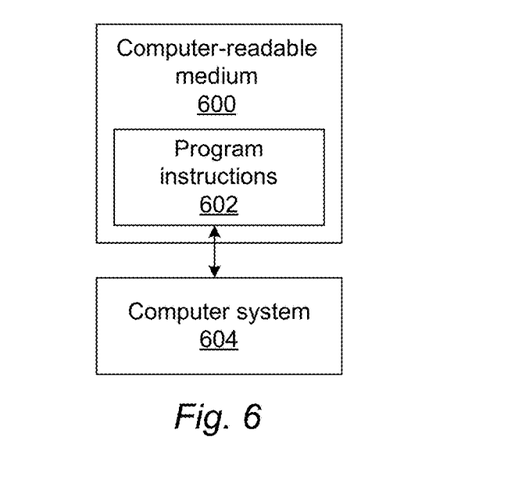
FIG. 6 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects in images of a specimen. One such embodiment is shown in FIG. 6. In particular, as shown in FIG. 6, non-transitory computer-readable medium 600 includes program instructions 602 executable on computer system 604. The computer-implemented method may include any step(s) of any method(s) described herein.

Program instructions 602 implementing methods such as those described herein may be stored on computer-readable medium 600. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension), Python, Tensorflow, or other technologies or methodologies, as desired.

Computer system 604 may be configured according to any of the embodiments described herein.

Further modifications and alternative embodiments of various aspects of the invention will be apparent to those skilled in the art in view of this description. For example, methods and systems for detecting defects in images of a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured to detect defects in images of a specimen, comprising:
   a computer subsystem; and
   one or more components executed by the computer subsystem, wherein the one or more components comprise an ensemble of deep learning models and a pseudo-loss function based on output generated by the ensemble of deep learning models; and
   wherein the computer subsystem is configured for:
      training the ensemble with a training dataset comprising training specimen images and training labels indicating if a defect is detected in the training specimen images, wherein the training comprises altering one or more parameters of the ensemble until the pseudo-loss function determined based on the output of the ensemble is approximately equal to but not greater than 0.5; and detecting defects in runtime specimen images by inputting the runtime specimen images into the trained ensemble of deep learning models and generating runtime labels for the runtime specimen images indicating if a defect has been detected in the runtime specimen images based on outputs of the deep learning models in the trained ensemble.

2. The system of claim 1, wherein the outputs of each of the deep learning models in the trained ensemble are a same type of information for the runtime specimen images.

3. The system of claim 1, wherein the training specimen images comprise less than 150 positive and negative examples of defects.

4. The system of claim 1, wherein each of the deep learning models comprises 6 convolutional layers and about 100,000 parameters.

5. The system of claim 1, wherein a sequence of weight and bias matrices represent layers of each of the deep learning models.

6. The system of claim 1, wherein the training further comprises determining the pseudo-loss function for each of the deep learning models in the ensemble and each sample in the training dataset.

7. The system of claim 1, wherein the pseudo-loss function is configured so that a false positive defect detection continuously increases a value of the pseudo-loss function and a true defect detection reduces the value of the pseudo-loss function in proportion to a maximum size of the true defect detection.

8. The system of claim 1, wherein the pseudo-loss function is configured so that weak true detections and false positive detections affect the pseudo-loss function on a continuous scale.

9. The system of claim 1, wherein the computer subsystem is further configured for computing a probability weight for each of multiple samples in the training dataset and selecting a portion of the multiple samples used for the training based on the computed probability weight for each of the multiple samples.

10. The system of claim 1, wherein the outputs of the deep learning models in the trained ensemble comprise two-dimensional probability map outputs, and wherein said generating the runtime labels comprises generating a two-dimensional weighted average map from the two-dimensional probability map outputs and assigning the runtime labels based on whether the two-dimensional weighted average map contains one or more detections that meet predetermined threshold and size criteria.

11. The system of claim 1, wherein the outputs of the deep learning models in the trained ensemble comprise two-dimensional probability map outputs, and wherein said generating the runtime labels comprises computing a final scalar decision function on a combination of the two-dimensional probability map outputs of each of the deep learning models in the trained ensemble.

12. The system of claim 1, wherein the training does not comprise optimizer hyper-parameter tuning of any of the deep learning models in the ensemble.

13. The system of claim 1, wherein at least one of the deep learning models in the ensemble is configured as a weak learning algorithm.

14. The system of claim 1, wherein the training further comprises hypothesis boosting.

15. The system of claim 1, wherein the runtime specimen images are generated during a defect review process performed on the specimen in a high volume manufacturing process.

16. The system of claim 1, wherein the training specimen images and the runtime specimen images are generated by an imaging subsystem of a defect review tool.

17. The system of claim 1, wherein the training specimen images and the runtime specimen images are generated by an electron beam-based imaging subsystem.

18. The system of claim 1, wherein the runtime specimen images input into the trained ensemble of deep learning models for any one location on the specimen comprise images generated with multiple detectors of an imaging subsystem.

19. A non-transitory computer-readable medium, storing program instructions executable on a computer system for performing a computer-implemented method for detecting defects in images of a specimen, wherein the computer-implemented method comprises:

training an ensemble of deep learning models with a training dataset comprising training specimen images and training labels indicating if a defect is detected in the training specimen images, wherein the training comprises altering one or more parameters of the ensemble until a pseudo-loss function determined based on output of the ensemble is approximately equal to but not greater than 0.5, and wherein one or more components executed by the computer system comprise the ensemble of deep learning models and the pseudo-loss function; and detecting defects in runtime specimen images by inputting the runtime specimen images into the trained ensemble of deep learning models and generating runtime labels for the runtime specimen images indicating if a defect has been detected in the runtime specimen images based on outputs of the deep learning models in the trained ensemble.

20. A computer-implemented method for detecting defects in images of a specimen, comprising:

training an ensemble of deep learning models with a training dataset comprising training specimen images and training labels indicating if a defect is detected in the training specimen images, wherein the training comprises altering one or more parameters of the ensemble until a pseudo-loss function determined based on output of the ensemble is approximately equal to but not greater than 0.5, and wherein one or more components executed by a computer system comprise the ensemble of deep learning models and the pseudo-loss function; and detecting defects in runtime specimen images by inputting the runtime specimen images into the trained ensemble of deep learning models and generating runtime labels for the runtime specimen images indicating if a defect has been detected in the runtime specimen images based on outputs of the deep learning models in the trained ensemble, wherein the training and the detecting are performed by the computer system.

* * * * *